United States Patent [19]

Huebner et al.

[11] Patent Number: 4,973,524
[45] Date of Patent: Nov. 27, 1990

[54] LAMINATED COMPOSITE COINS AND METHOD THEREOF

[75] Inventors: Ulrich Huebner, Werdohl; Horst Rinke, Lüdensheid; Hans M. Walter, Werdohl; Gerhard von Loh, Altena, all of Fed. Rep. of Germany

[73] Assignee: VDM Nickel-Technologie Aktiengesellschaft, Frankfurt am Main, Fed. Rep. of Germany

[21] Appl. No.: 355,013

[22] Filed: May 19, 1989

[30] Foreign Application Priority Data

May 25, 1988 [DE] Fed. Rep. of Germany ....... 3817657

[51] Int. Cl.⁵ ............................................. B32B 15/00
[52] U.S. Cl. ...................................... 428/683; 72/359; 40/27.5
[58] Field of Search .......... 428/683; 40/27.5; 72/359, 700

[56] References Cited

U.S. PATENT DOCUMENTS 3,694,271 9/1972 Egnell .................................. 428/683
4,705,727 11/1987 Hunter ................................ 428/683

Primary Examiner—Deborah Yee
Attorney, Agent, or Firm—Herbert Dubno

[57] ABSTRACT

For use in the making of coins a laminated composite is proposed which can be used to substitute coins made of nickel and consists of a combination of a ferritic chromium steel and an austenitic nickel-chromium steel. In dependence of the nature of the existing system used to discriminate the nickel coins to be substituted, a laminated composite may be used which has a core layer consisting of the ferritic chromium steel and provided on both sides with a cladding having a thickness of 2 to 10% of the total thickness and consisting of the austenitic nickel-chromium steel, or a laminated composite which comprises a core layer consisting of the austenitic nickel-chromium steel and provided on both sides with a cladding having a thickness of 20 to 40% of the total thickness and consisting of the ferritic chromium steel. An optimum approxmation of the acceptability ranges adjusted for nickel in the discriminating systems can be achieved by a proper selection of the ratios of the thicknesses of the layers.

7 Claims, 2 Drawing Sheets

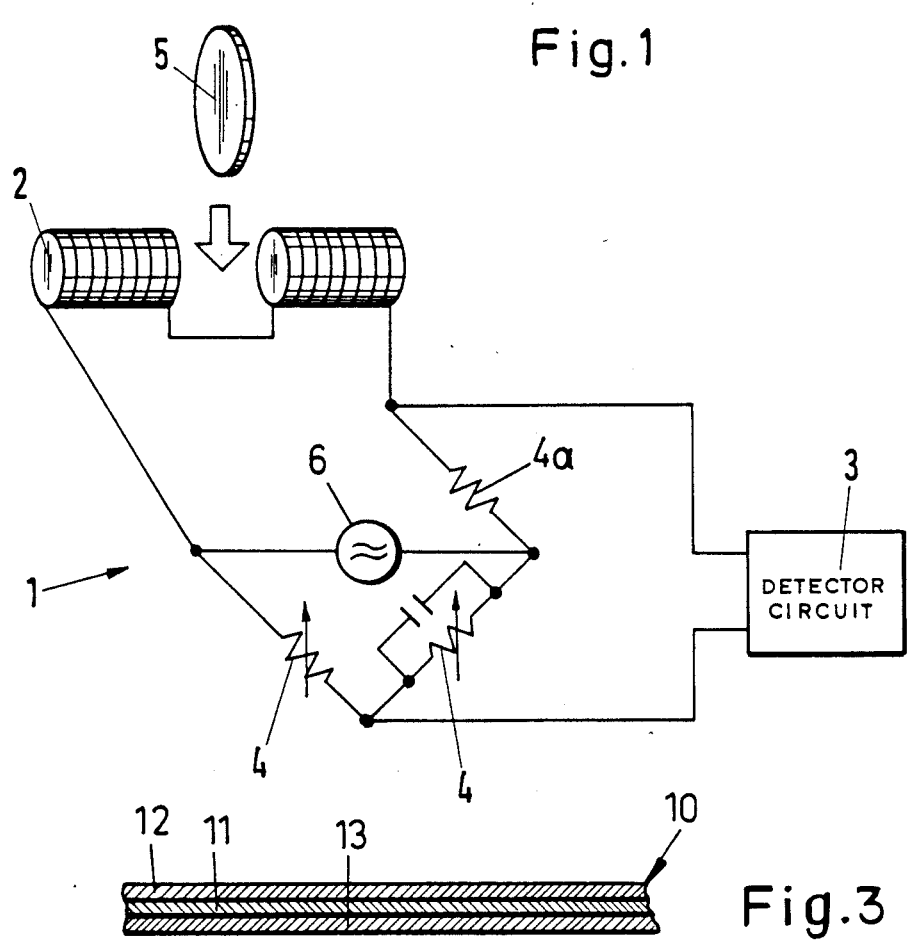
Fig.1
Fig.3
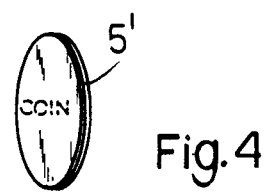
Fig.4

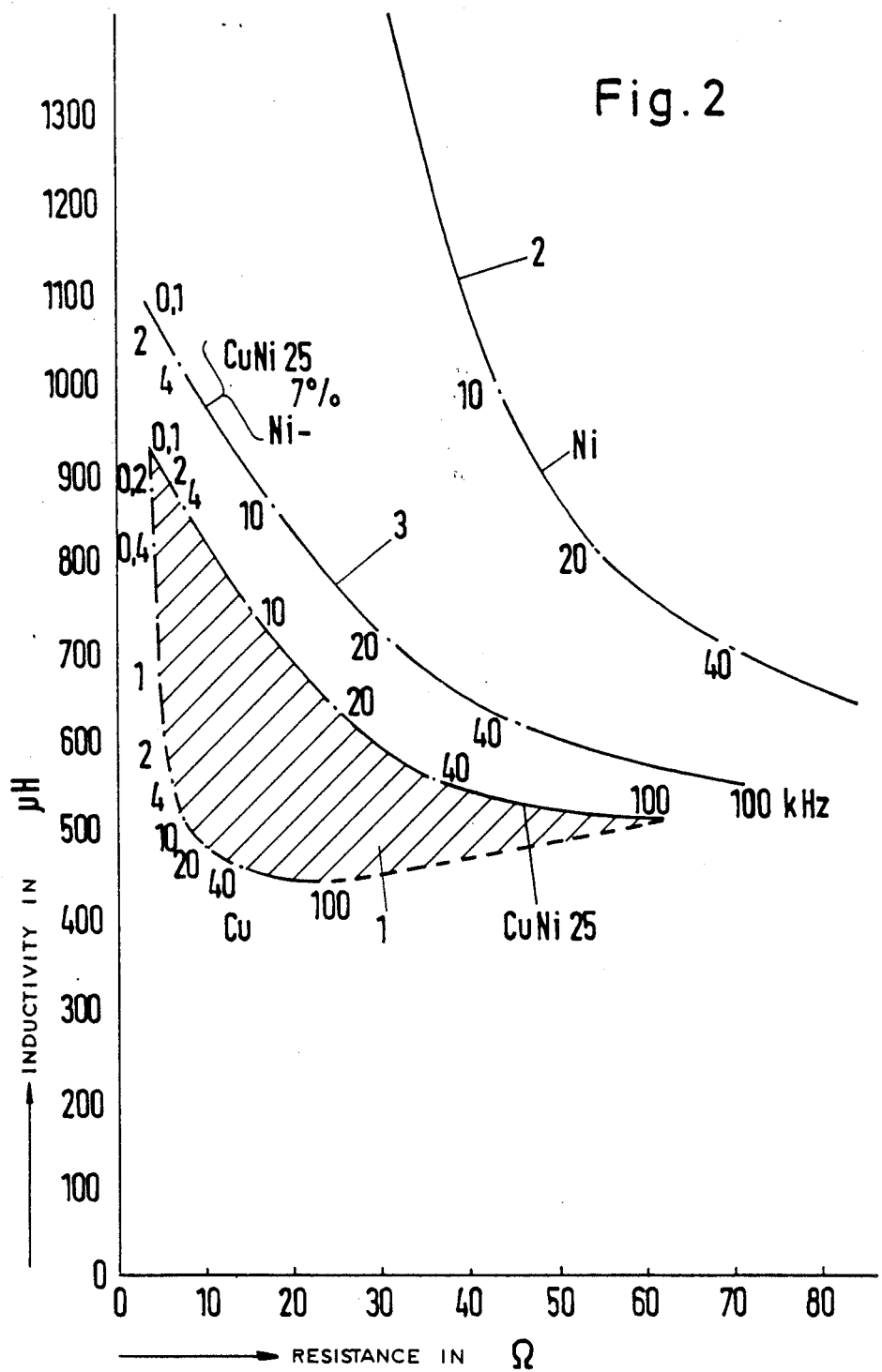

LAMINATED COMPOSITE COINS AND METHOD THEREOF

FIELD OF THE INVENTION

Our present invention relates to a laminated composite for making coins which ar usable as a substitute for coins of nickel or of alloys consisting mainly of nickel. The invention also relates to a method of making coins and the coins made using the composite.

BACKGROUND OF THE INVENTION

In the currency coins which were conventionally used in former times, the value of the metal (gold, silver) substantially corresponded to the denomination of the coins so that their actual value changed with the price of the metal.

As industrialization and the intensification of commerce and transport resulted in an increasing demand for coins, that demand was increasingly met since the middle of the nineteenth century by divisional coins having a metal value which usually amounted to only a fractional part of the denomination or impressed value. But even divisional coins made of gold or silver are no longer common at the present time because the metal value has risen so greatly that it has reached or exceeded the impressed value of the coins or because the metal value is at least too high for an economical making of coins.

For this reason, various efforts have been made to replace the orthodox coinage metals gold and silver by other materials. In such efforts it has often been attempted to retain the original color of the coins so that nickel has replaced silver and certain copper alloys have replaced gold.

However, even materials consisting of nickel or of alloys consisting mainly of nickel and used in large amounts as substitutes for silver are now regarded as being too expensive for the making of coins and it is desired to replace them with less expensive materials.

As the substitute materials obviously should have the same performance properties as nickel, aluminum cannot be used because its specific gravity is too low and normal ferrous materials cannot be used owing to their inadequate resistance to corrosion.

But the selection of a suitable substitute material is difficult mainly because the coins made of the new material must be used contemporaneously with coins having the same denomination and made of nickel or nickel alloys at least for some time because the change to the use of the new coins can hardly be effected on a given date from a technical aspect and this would not be reasonable economically. For this reason along the new coins must agree with the old coins in all properties which are detected in automatic coin discriminators. That requirement will have to be met even if a change was to be effected on a specific date because an alteration or substitution of all coin-operated machines to adopt them to the different discriminating properties of the new coins usually cannot be effected in such short order.

Mechanical coin discriminators are used only rarely at present; they test the dimensions of the coin, its density and its rebound behavior upon an impact on an anvil. Such relatively simple tests have been supplemented or replaced in the course of time by the detection of the electrical and magnetic properties of the coins and the coin discriminator can influence the movement of the coins so that counterfeit coins can effectively be distinguished.

Permanent magnets may be provided for retarding electrically conducting but non-magnetizable coins by the braking effect of eddy currents. In that case the ratio of specific density and specific electric conductance of the material of the coin will be critical and a very narrow response range for that ratio can be adjusted.

The movement of magnetizable coins can directly be influenced by magnets. In this case a retardation, acceleration or lateral deflection will affect the coins in most cases as they are flying freely with the result that only coins consisting of the "proper" coinage material will enter the well for receiving acceptable coins.

The discrimination of coins has been improved further in recent times by the provision of so-called electronic coin discriminators. Such a discriminator can consist of an a.c. measuring bridge which in one arm contains a pair of sensor coils, and an electronic device for processing and evaluating the results of measurement. By means of trimming resistors and calibrating coins, the a.c. bridge is so adjusted that its diagonal voltage will be zero when a "proper" coin 5 is disposed between the sensor coils, i.e. a coin which in its dimensions and its material properties agrees with the calibrating coin. That balance indication is used as an indicating signal and is utilized for a decision regarding acceptability. The solenoid coils may be tuned to different frequencies, preferably in the range from 0.1 to 100 kHz. The reliability of the discrimination may greatly be increased by a multiple discrimination at different frequencies. At least two discriminations are usually required for a detection of the influence of the dimensions of the coin in addition to the properties of the material.

For the substitution of nickel by a different material this means that in a discrimination at the conventional frequencies the substitute material must give substantially the same results as nickel.

OBJECTS OF THE INVENTION

For this reason it is an object to provide a coinage material which is less expensive than nickel or coinage alloys consisting mainly of nickel and can be used as substitute for them as regards all performance properties and which as regards its detectable properties is not so greatly different from the material which is to be existing coin detectors must be replaced or altered.

Another object of the invention is to provide a coin which has electrical and magnetic properties generally corresponding to coins made of nickel or coinage alloys consisting mainly of nickel.

It is also an object of this invention to provide an improved method of making a coin.

SUMMARY OF THE INVENTION

These objects are attained by the provision of a minted composite comprising a core layer which has a core of ferritic chromium steel and is clad on both of its opposite sides with layers consisting of austenitic nickel-chromium steel. In accordance with a further feature of the invention the thickness of the cladding layers is twice 2 to 10% of the total thickness of the laminated composite. The thickness of the cladding layers preferably amounts to twice 5% of the total thickness of the laminated composite.

The object set forth is also accomplished in that the laminated composite consists of a core layer which consists of austenitic nickel-chromium steel and is clad on both sides with a layer consisting of ferritic chromium steel. The thickness of the cladding layers amounts to twice 20 to 40%, preferably to twice 30%, of the total thickness of the laminated composite.

The chromium steel suitably consists of the stainless ferritic steel X8Cr17 (Material No. 1.4016, having $\leq$ 0.08 C, $\leq$ 1.0 Si, $\leq$ 1.0 Mn, $\leq$ 0.045P, $\leq$ 0.030S, 15.5 to 17.5 Cr, all in percent by weight) and the nickel-chromium steel preferably consists of the stainless austenitic steel X5CrNi1911 (Material No. 1.4303, having $\leq$ 0.07 C, $\leq$, 1.0 Si, $\leq$ 2.0 Mn, $\leq$ 0.045P, $\leq$ 0.030S, 17.0 to 19.0 Cr, 11.0 to 13.0 Ni, all in percent by weight).

The laminated material of the invention which can be used to make coins which act in existing coin detectors similarly to nickel coins or coins made from alloys containing nickel as a major component can comprise:

a core layer of a first corrosion-resistant steel and cladding layers on opposite sides of said core layer and composed of a second corrosion-resistant steel, one of said corrosion-resistant steels being a ferritic chromium steel, the other of said corrosion-resistant steels being an austenitic nickel-chromium steel.

The invention also comprises the method of making such coins which comprises fabricating the laminated material previously described and then coining the coins from such material so that each of the coins has a core layer flanked by cladding layers of steel as described. The latter coins are also the subject of this invention.

Any conventional cladding method commonly used in making cladded in coins or materials from which cladded coins can be made, can be employed in accordance with this invention.

BRIEF DESCRIPTION OF THE DRAWING

The above and other objects, features and advantages of my invention will become more readily apparent from the following description, reference being made to the accompanying highly diagrammatic drawing in which:

FIG. 1 is a perspective view showing the principles of a prior art coin detector;

FIG. 2 is a graph illustrating principles of the invention;

FIG. 3 is a cross sectional view through the material of the invention; and

FIG. 4 is a coin made from the cladded material.

SPECIFIC DESCRIPTION

As previously indicated, an electronic coin discriminator which can be used for the detection of coins 5, e.g. prior art nickel coin or coins consisting predominantly of nickel, or coins 5' which are laminated from the material of FIG. 3, is shown in FIG. 1. Here the a.c. measuring bridge 1 contains a pair of sensor coils 2 in one branch and an electronic device 3 connected across a diagonal of the bridge, for processing and evaluating the measurement results. By means of trimming resistors 4 and a fixed resistor 4a, the bridge energized by the source 6 is so adjusted that its diagonal voltage will be zero when a proper coin 5 is disposed between the coils 2. A proper coin, of course, is one which in its dimensions and material properties agrees with the calibrating coin.

FIG. 2 shows the locus diagrams of the complex impedance for different materials and different testing frequencies for coins having the same dimensions. The real part in ohms is plotted along the axis of abscissas and the imaginary part in microhenries is plotted along the axis of ordinates. The numerals indicated at the curves state the testing frequency in kHz. It is immediately apparent that the previously used nonmagnetic coin materials, i.e., copper and copper and copper alloys containing up to 25% nickel (hatched area 1) cannot be used as substitutes because their typical detectable values are remote from curve 2 for nickel at all frequencies. The weakly magnetizable known laminated composite having a nickel core occupying 7% of the total thickness and two cover layers, which have a thickness of 46.5% of the total thickness and consist of a copper alloy containing 25% nickel, curve 3, cannot be used because in that case too, the range of usual frequencies does not contain a point at which the complex impedance agrees with is even close to that of nickel.

FIG. 3 shows the actual material or laminated composite 10 for making coins which are visible as a substitute for coins of nickel or of alloys consisting mainly of nickel. The laminated composite consists of a core layer 11 which is composed of a first stainless steel and is clad on both sides with layers 12 and 13 consisting of a second stainless steel. One of these stainless steels is a ferritic chromium steel while the other is austenitic nickel-chromium steel. Any conventional cladding technique can be used to form the composite. The coins 5', likewise having 3 layers, are formed from this composite.

Coin blanks having a thickness of 2 mm and made from the first-mentioned substitute material were placed between two sensor coils as shown in FIG. 1 and the impedance of the arrangement consisting of the coils and the coin was measured at 0.1 kHz and 100 kHz to determining the real part (dissipative resistance R in ohms) and the imaginary part (inductive reactance L in henries). In the same manner, coin blanks made of pure nickel, of the stainless ferritic steel X8Cr17 (Material No. 1.4016) and of the stainless austenitic steel X5CrNi1911 (Material No. 1.4303) were investigated. The results are apparent from Table 1.

As regards the inductive reactance L at a frequency of 0.1 kHz there is very good agreement between nickel (first line) and the composite in accordance with the invention (fourth line). The difference is only 1.2%, which is not very large compared to an acceptability range of a few percent which is to be adjusted in the discriminators.

At the measuring frequency of 100 kHz, the difference between nickel and the composite in accordance with the invention is larger but a closer agreement can be achieved by a fine adjustment of the selected thicknesses of the layers if it is essential to effect the discrimination at 100 kHz and with a narrow acceptability range rather than at 0.1 kHz, where a very close agreement is reached. It is apparent that the steels used in the composite in accordance with the invention (lines 2 and 3) have inductive reactances which are clearly above and below, respectively, the values for nickel so that within the range of the ratios of the thicknesses of the layers which are specified or can technically be provided it will virtually always be possible to obtain an adequate agreement between the composite and nickel at the predetermined discriminating frequencies.

Similar remarks are applicable to the dissipative resistance R, the values of which are relatively close to each other for all four specimens at a measuring frequency of 0.1 kHz so that a corresponding acceptability range can be adjusted At a measuring frequency of 100 kHz the steels contained in the composite have values which are distinctly above and below, respectively, the value for nickel so that a fine selection of the proportions of the layer will also permit an approximation to the value for nickel.

The price relations at the present time are apparent from the last column. In accordance therewith the price of the ferritic steel X8Cr17 (line 2) is only above ¼ of the price of nickel, the price of the stainless austenitic steel X5CrNi1911 (line 3) is only about ⅓ and the price of the composite (line 4) only about one-half. In the last-mentioned case the higher processing costs which are due to the cladding have already been taken into account.

It can be stated in conclusion that the substitution problem described hereinbefore can be solved as regards all requirements by the first-mentioned laminated composite.

For use in coin discriminating systems in which the electric damping of the test specimen is used as a parameter for the detection and distinction of counterfeit coins, the laminated composite in accordance with the invention defined in the second place may be used. The degrees of damping determined at a testing frequency of 50 kHz for the four different coin materials are apparent from Table 2.

It is surprising that the damping of the laminate composite in accordance with line 4 does not lie between the values for the individual materials stated in lines 2 and 3 but is clearly higher than the higher value for X8Cr17 (line 2) and is so close to the value for nickel that a different acceptability range need not be adjusted in case of a substitution for nickel. In that case, a closer agreement with the degrees of damping for nickel can also be achieved by a fine adjustment of the ratios of the thicknesses of the layers.

It is apparent that the laminated composites in accordance with the invention, which are made from the same starting materials, can be used as a substitute for nickel in such a manner that a sacrifice as regards all conventional performance properties will not be required and as regards all properties which are detected in the most up-to-date coin discriminators the composite may be so designed, that the acceptability ranges which have been adjusted in the coin discriminator for nickel need not be changed or must be changed only slightly.

TABLE I

| | | L in pH | | R in ohms | | Price ratio |
|---|---|---|---|---|---|---|
| | | 0.1 kHz | 100 kHz | 0.1 kHz | 100 kHz | |
| 1 | Nickel | 4,840 | 610 | 4.7 | 132 | 1 |
| 2 | X8Cr17 | 9,300 | 1,350 | 4.2 | 491 | 0.25 |
| 3 | X5CrNi1911 | 930 | 560 | 3.6 | 83 | 0.33 |
| 4 | 2 × 5% (3) clad on (2) | 4,780 | 870 | 3.8 | 397 | 0.5 |

TABLE II

| | | Degree of damping in dB |
|---|---|---|
| 1 | Nickel | 65.3 |
| 2 | X8Cr17 | 58.4 |
| 3 | X5CrNi1911 | 19.1 |
| 4 | 2 × 30% (2) clad on (3) | 66.9 |

I claim:
1. A method of making coins which are usable as a substitute for nickel-containing coins which comprises the steps of:
 (a) forming a laminated composite comprising a core layer of a first corrosion-resistant steel and cladding layers on opposite sides of said core layer and composed of a second corrosion-resistant steel, one of said corrosion-resistant steel being a ferritic chromium steel, the other of said corrosion-resistant steels being an austenitic nickel-chromium steel; and
 (b) coining blanks of said composite.

2. The method defined in claim 1 wherein said core layer consists of said ferritic chromium steel and said cladding layers consist of said austenitic nickel-chromium steel.

3. The method defined in claim 1 wherein each cladding layer has a thickness which is substantially 2 to 10% of the total thickness of the laminated composite.

4. The method defined in claim 1 wherein the ferritic chromium steel is X8Cr17 stainless steel and the austenitic nickel-chromium steel is X5CrNi1911 stainless steel.

5. A coin made from a laminated composite comprising a core layer of a first corrosion-resistant steel and cladding layers on opposite sides of said core layer and composed of a second corrosion-resistant steel, one of said corrosion-resistant steel being a ferritic chromium steel, the other of said corrosion-resistant steels being an austenitic nickel-chromium steel.

6. The coin defined in claim 5 wherein said core layer consists of said ferritic chromium steel and said cladding layers consist of said austenitic nickel-chromium steel.

7. The coin defined in claim 5 wherein each cladding layer has a thickness which is substantially 2 to 10% of the total thickness of the laminated composite.

* * * * *